US012768371B2

(12) United States Patent
Ikeda et al.

(10) Patent No.: US 12,768,371 B2
(45) Date of Patent: Oct. 20, 2026

(54) HYDRAULIC VALVE AND HYDRAULIC CIRCUIT

(71) Applicant: Komatsu Ltd., Tokyo (JP)

(72) Inventors: Masatoshi Ikeda, Tokyo (JP); Wataru Sumino, Tokyo (JP); Takashi Akamatsu, Tokyo (JP)

(73) Assignee: KOMATSU LTD., Tokyo (JP)

( * ) Notice: Subject to any disclaimer, the term of this patent is extended or adjusted under 35 U.S.C. 154(b) by 189 days.

(21) Appl. No.: 18/850,086

(22) PCT Filed: Apr. 4, 2023

(86) PCT No.: PCT/JP2023/013978

§ 371 (c)(1),
(2) Date: Sep. 24, 2024

(87) PCT Pub. No.: WO2023/218803

PCT Pub. Date: Nov. 16, 2023

(65) Prior Publication Data

US 2026/0177081 A1 Jun. 25, 2026

(30) Foreign Application Priority Data

May 13, 2022 (JP) ................................ 2022-079739

(51) Int. Cl.
*F15B 13/02* (2006.01)
*F15B 11/024* (2006.01)
(Continued)

(52) U.S. Cl.
CPC .......... *F15B 13/021* (2013.01); *F15B 11/024* (2013.01); *F15B 13/0402* (2013.01);
(Continued)

(58) Field of Classification Search
CPC ............ F15B 11/024; F15B 2011/0246; F15B 13/021; F15B 13/0403; F15B 2211/3058;
(Continued)

(56) References Cited

U.S. PATENT DOCUMENTS 4,095,617 A 6/1978 Hodgson
6,792,844 B1 * 9/2004 Gedge .................. F15B 13/021 251/63.4
(Continued)

FOREIGN PATENT DOCUMENTS

CN 104455548 A 3/2015
JP S53-14419 A 2/1978
(Continued)

*Primary Examiner* — Michael Leslie
(74) *Attorney, Agent, or Firm* — Troutman Pepper Locke LLP

(57) ABSTRACT

A hydraulic valve includes: a valve main body having a first port and a second port; and a spool movable along an axial center with respect to the valve main body. Further, the spool is provided with a main passage portion, a first passage portion, and a second passage portion, an opening area of the first passage portion with respect to the first port is changed, and flow rate control of oil from the first port to the second port through the main passage portion is performed, a plurality of the first passage portions is provided in the spool in, and the main passage portion of the spool has a first region, a second region, and a third region, an inner diameter of the first region being formed larger than that of the second region, and the third region being formed in a tapered shape.

4 Claims, 6 Drawing Sheets

(51) Int. Cl.
*F15B 13/04* (2006.01)
*F16K 11/07* (2006.01)

(52) U.S. Cl.
CPC ... *F16K 11/0716* (2013.01); *F15B 2011/0246* (2013.01); *F15B 2211/3058* (2013.01)

(58) Field of Classification Search
CPC ... F16K 3/24; F16K 3/26; F16K 3/267; F16K 11/0708; F16K 11/0716
See application file for complete search history.

(56) References Cited

U.S. PATENT DOCUMENTS

| | | | | |
|---|---|---|---|---|
| 11,753,969 | B2 * | 9/2023 | Figueiredo | F01L 1/34409 123/90.15 |
| 11,987,958 | B2 * | 5/2024 | Kondo | E02F 9/2278 |
| 2004/0093769 | A1 | 5/2004 | Kondou | |
| 2025/0215906 | A1 * | 7/2025 | Ikeda | F16K 11/0716 |

FOREIGN PATENT DOCUMENTS

| | | | | | |
|---|---|---|---|---|---|
| JP | 61116106 | A | * | 6/1986 | F15B 11/024 |
| JP | H09-159036 | A | | 6/1997 | |
| JP | 2002-181004 | A | | 6/2002 | |
| JP | 2007-107677 | A | | 4/2007 | |

* cited by examiner

HYDRAULIC VALVE AND HYDRAULIC CIRCUIT

FIELD

The present disclosure relates to a hydraulic valve and a hydraulic circuit.

BACKGROUND

Some of hydraulic valves in which a spool moves in an axial direction with respect to a valve main body include a main passage portion that allows oil to pass inside the spool. That is, in this hydraulic valve, the main passage portion in the axial direction is provided inside the spool, and a first opening and a second opening are provided in a radial direction in such a manner as to open from the main passage portion to an outer peripheral surface of the spool. The first opening can communicate with a first port provided in the valve main body, and the second opening can communicate with a second port provided in the valve main body. In this hydraulic valve, it is possible to change an opening area of the first opening with respect to the first port along with a movement of the spool and to perform flow rate control of oil from the first port to the second port through the main passage portion of the spool (see, for example, Patent Literature 1).

CITATION LIST

Patent Literature

Patent Literature 1: Japanese Patent Application Laid-open No. 2007-107677 (FIG. 4)

SUMMARY

Technical Problem

In order to finely perform a flow rate control, it is preferable to provide a plurality of first openings at positions shifted in an axial center direction of a spool in such a manner that timing of communicating with a first port become different from each other. That is, in a case where the plurality of first openings is provided, the opening area of the first openings can be finely changed along with the movement of the spool, and the flow rate control can be finely performed.

However, in the above-described hydraulic valve, in a case where the fine flow rate control is performed, oil flows into the main passage portion of the spool from the first port in a state in which a part of the first opening is closed by a land portion of the valve main body. Since the first opening closed by the land portion of the valve main body is a recessed portion opened to the main passage portion, the oil therein is easily accumulated.

Here, in a case where oil flows from the first port on a high pressure side to the main passage portion on a low pressure side, air bubbles are generated in the oil, and the air bubbles move inside the main passage portion together with the oil. The oil flowing into the main passage portion is appropriately reversed inside the main passage portion until being discharged to the second port through a second passage portion. In a case where the air bubbles included in the oil reversed to an upstream side reach the recessed portion formed by the first opening, the air bubbles may be accumulated inside and cause erosion in the land portion by collapse. Thus, when a utilization period becomes long and the erosion of the land portion progresses, for example, an increase in a leakage amount of the oil from between the land portion and the spool is caused, and a problem such as difficulty in accurate flow rate control of the oil may be caused.

In view of the above circumstances, an object of the present disclosure is to provide a hydraulic valve and a hydraulic circuit capable of accurately and finely perform the flow rate control of oil over a long period.

Solution to Problem

To attain the object, a hydraulic valve according to the present disclosure includes: a valve main body having a first port and a second port independent from each other; and a spool arranged in such a manner as to be movable along an axial center with respect to the valve main body. Further, the spool is provided with a main passage portion provided in an axial center portion, a first passage portion provided between the main passage portion and an outer peripheral surface and communicable with the first port, and a second passage portion provided between the main passage portion and an outer peripheral surface and communicable with the second port, an opening area of the first passage portion with respect to the first port is changed along with movement of the spool, and flow rate control of oil from the first port to the second port through the main passage portion is performed, a plurality of the first passage portions is provided in the spool in such a manner as to communicate with the first port at timings different from each other, and the main passage portion of the spool has a first region in which the first passage portions are provided, a second region in which the second passage portion is provided, and a third region that connects the first region and the second region, an inner diameter of the first region being formed larger than that of the second region, and the third region being formed in a tapered shape in which an inner diameter gradually decreases toward the second region.

Advantageous Effects of Invention

According to the present disclosure, since a third region having a gradually-decreased inner diameter is provided between a first region and a second region, oil smoothly flows downstream, and air bubbles generated in oil when flowing from a first port into a main passage portion travel downstream without being accumulated in the first region. Furthermore, when the oil is reversed from the second region toward the first region, the third region functions as a diffuser and pressure of the oil reaching the first region is reduced. Thus, even when air bubbles are accumulated in the first passage portion, it is possible to prevent the collapse thereof, and there is no possibility that erosion is generated in a land portion of a valve main body. As a result, a leakage amount of the oil does not increase even in a case where a utilization period becomes long, and the flow rate control of the oil can be accurately and finely performed.

DESCRIPTION OF EMBODIMENTS

In the following, a preferred embodiment of a hydraulic valve and a hydraulic circuit according to the present disclosure will be described in detail with reference to the accompanying drawings.

Figure 1:
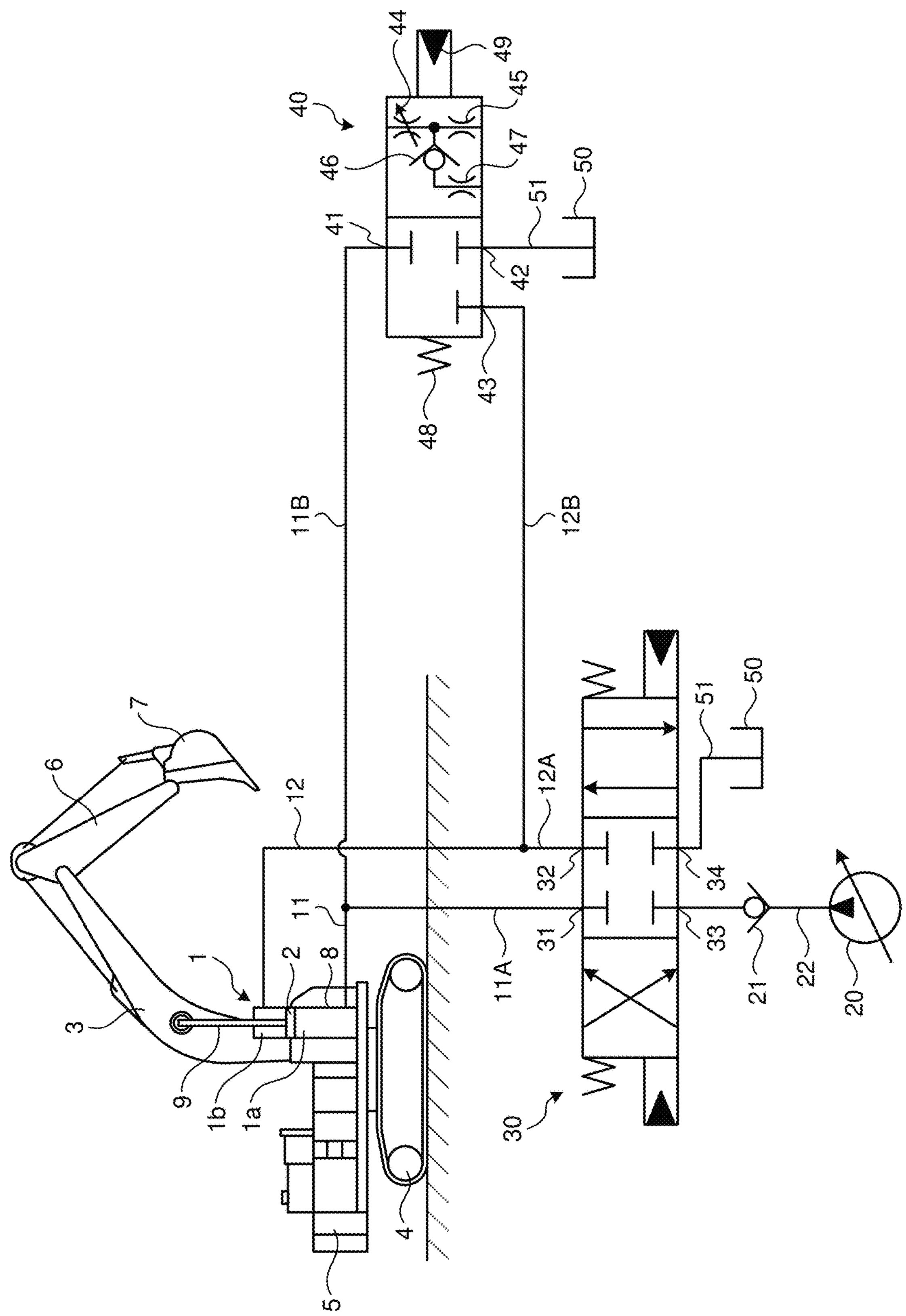
FIG. 1 is a circuit diagram illustrating a hydraulic circuit to which a hydraulic valve of an embodiment of the present disclosure is applied.
Figure 2:
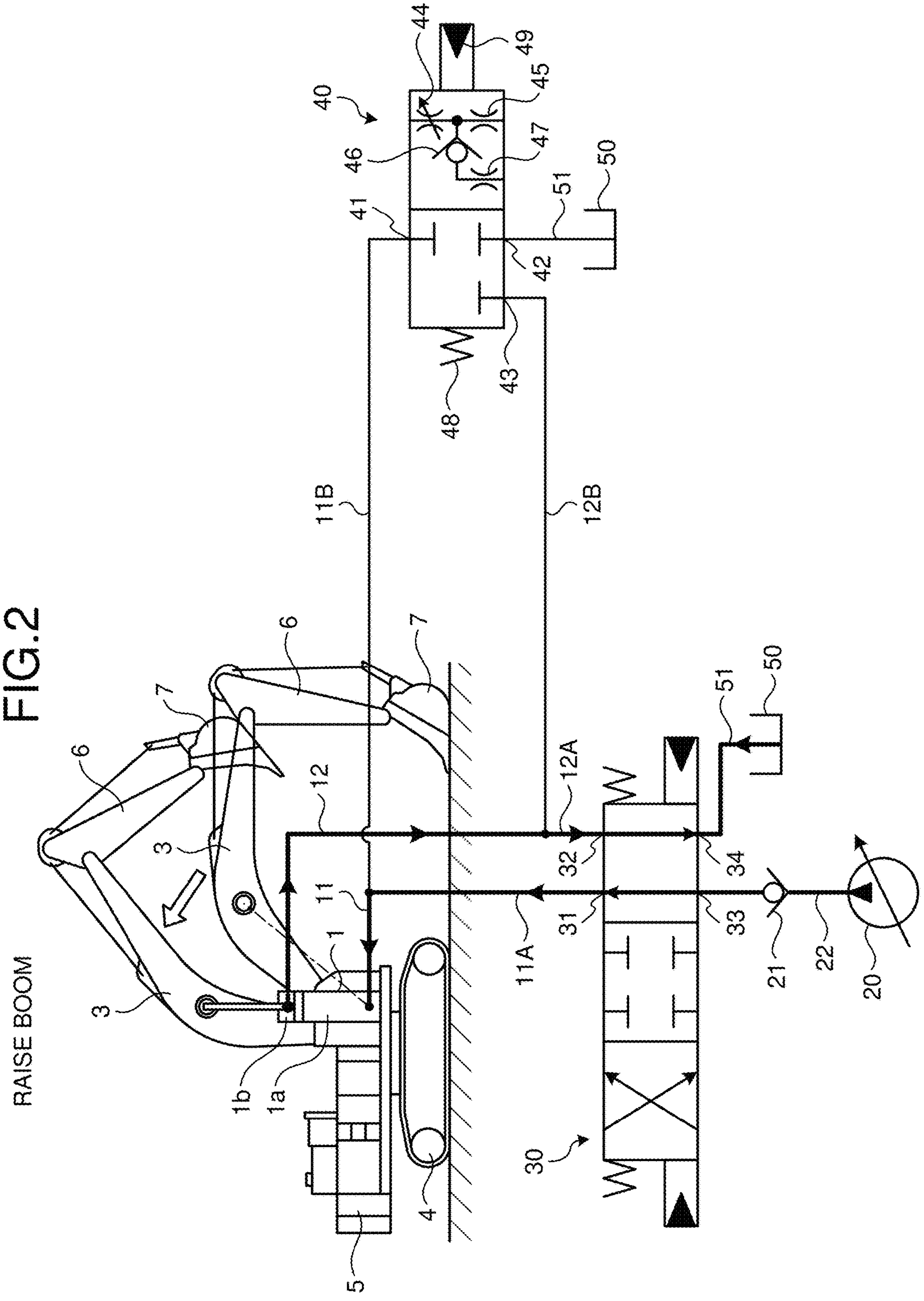
FIG. 2 is a view illustrating a state in which a hydraulic cylinder performs an extension operation in the circuit diagram illustrated in FIG. 1.
Figure 3:
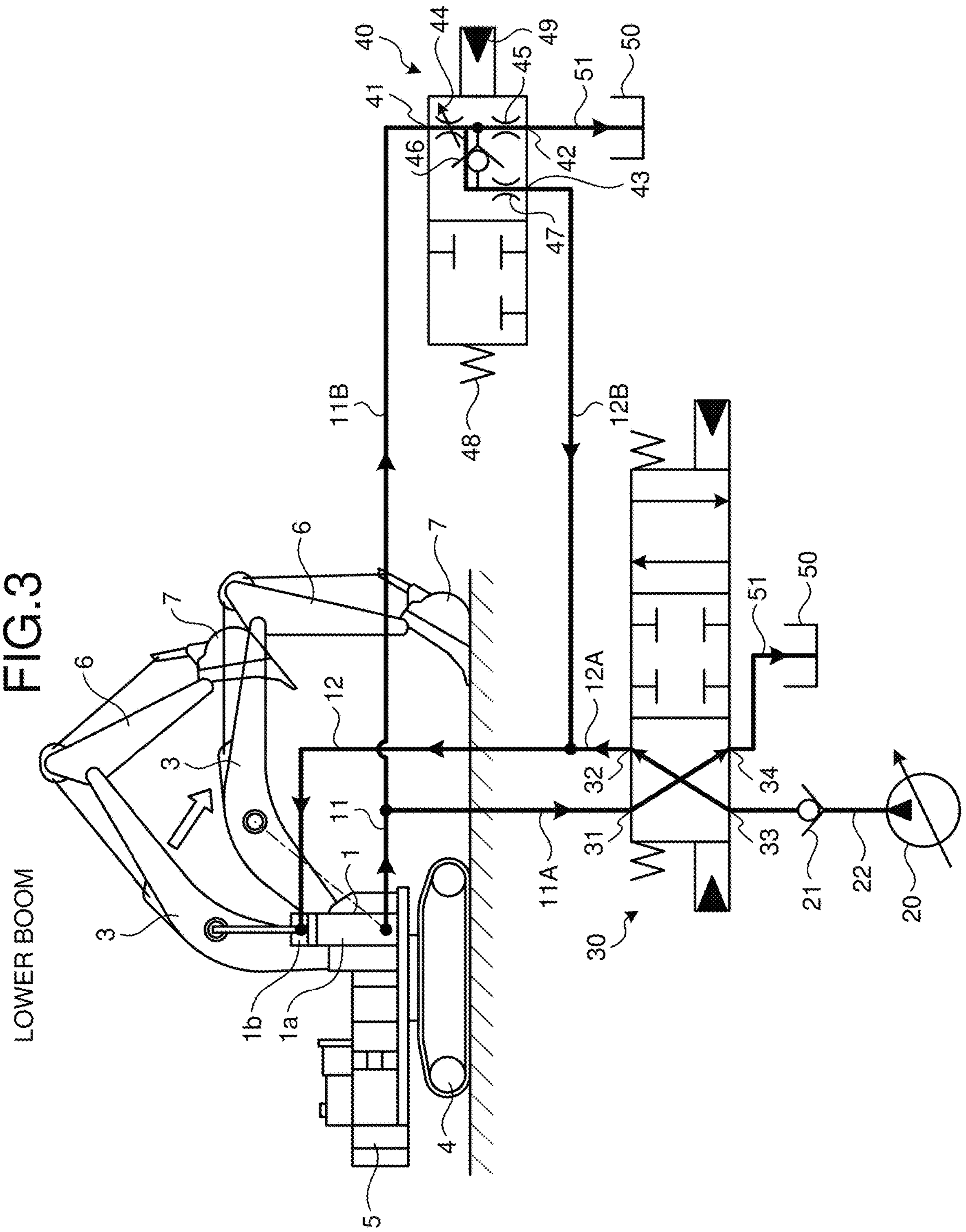
FIG. 3 is a view illustrating a state in which the hydraulic cylinder performs a contraction operation in the circuit diagram illustrated in FIG. 1.

FIG. 1 to FIG. 3 are views illustrate a hydraulic circuit according to an embodiment of the present disclosure. The hydraulic circuit described here as an example is to operate a hydraulic cylinder 1 with oil supplied from a hydraulic pump. The hydraulic cylinder 1 is a single-rod double-acting type including a single piston 2. In the present embodiment, the hydraulic cylinder 1 to operate a boom 3 in a work machine is described as an example. In the work machine, an upper swing body 5 is arranged in an upper portion of a lower travelling body 4 in a manner of being rotatable about a swing axis in an up-down direction, and the boom 3 is provided in the upper swing body 5. The boom 3 is rotatably supported in the upper swing body 5 via a base end portion by a boom support shaft in a horizontal direction. In the drawing, a reference sign 6 denotes an arm provided at a leading end portion of the boom 3, and a reference sign 7 denotes a bucket provided at a distal end portion of the arm 6.

The hydraulic cylinder 1 is coupled to the upper swing body 5 via a cylinder body 8, and is coupled to the boom 3 via a rod 9. The leading end portion of the boom 3 moves upward with respect to the upper swing body 5 in a case where the hydraulic cylinder 1 performs the extension operation, and the leading end portion of the boom 3 moves downward with respect to the upper swing body 5 in a case where the hydraulic cylinder 1 performs the contraction operation. In the hydraulic cylinder 1, a bottom oil passage 11 is connected to a bottom chamber 1*a*, and a rod oil passage 12 is connected to a rod chamber 1*b*. The bottom oil passage 11 is bifurcated into a first bottom oil passage 11A and a second bottom oil passage (meter-out oil passage) 11B on the way. Similarly, the rod oil passage 12 is bifurcated into a first rod oil passage 12A and a second rod oil passage 12B on the way.

The hydraulic circuit includes a hydraulic pump 20, a direction switching valve 30 to operate the hydraulic cylinder 1, and a flow rate control valve (hydraulic valve) 40.

The hydraulic pump 20 is of a variable displacement type driven by an engine (not illustrated). A pump oil passage 22 having a check valve 21 is connected to a discharge port of the hydraulic pump 20.

The direction switching valve 30 is operated by pilot pressure from an operation valve (not illustrated), and is configured to switch connection states of a pump port 33 and a tank port 34 with respect to a first input/output port 31 and a second input/output port 32. More specifically, in a case where the direction switching valve 30 is arranged at a neutral position illustrated in FIG. 1, each of the two input/output ports 31 and 32, the pump port 33, and the tank port 34 is in a shut-off state. When the direction switching valve 30 is moved to a left from this state and arranged at an extended position as illustrated in FIG. 2, the first input/output port 31 is connected to the pump port 33 and the second input/output port 32 is connected to the tank port 34. On the other hand, when the direction switching valve 30 is moved to a right from the neutral position and arranged at a contracted position as illustrated in FIG. 3, the first input/output port 31 is connected to the tank port 34 and the second input/output port 32 is connected to the pump port 33. In the direction switching valve 30, the first bottom oil passage 11A is connected to the first input/output port 31, and the first rod oil passage 12A is connected to the second input/output port 32. The pump oil passage 22 is connected to the pump port 33, and a tank oil passage 51 leading to an oil tank 50 is connected to the tank port 34.

The flow rate control valve 40 is operated by pilot pressure from an operation valve (not illustrated), and is configured to switch connection states of a drain port (second port) 42 and a regeneration port 43 with respect to a meter-out port (first port) 41. More specifically, in a case where the flow rate control valve 40 is arranged at a closed position illustrated in the drawing, each of the meter-out port 41, the drain port 42, and the regeneration port 43 is in the shut-off state. When the flow rate control valve 40 is moved to the left from this state and is arranged at a control position as illustrated in the drawing, the meter-out port 41 is connected to the drain port 42 and the regeneration port 43. A meter-out throttle 44 is provided between the meter-out port 41 and the drain port 42 and the regeneration port 43 in such a manner that an opening area increases as the pilot pressure applied from the operation valve (not illustrated) increases. A drain-side fixed throttle 45 is provided downstream of the meter-out throttle 44 between the meter-out port 41 and the drain port 42. Between the meter-out port 41 and the regeneration port 43, a check valve 46 and a regeneration-side fixed throttle 47 are provided downstream of the meter-out throttle 44. In the flow rate control valve 40, the second bottom oil passage 11B is connected to the meter-out port 41, and the tank oil passage 51 is connected to the drain port 42. The second rod oil passage 12B is connected to the regeneration port 43.

Figure 4:
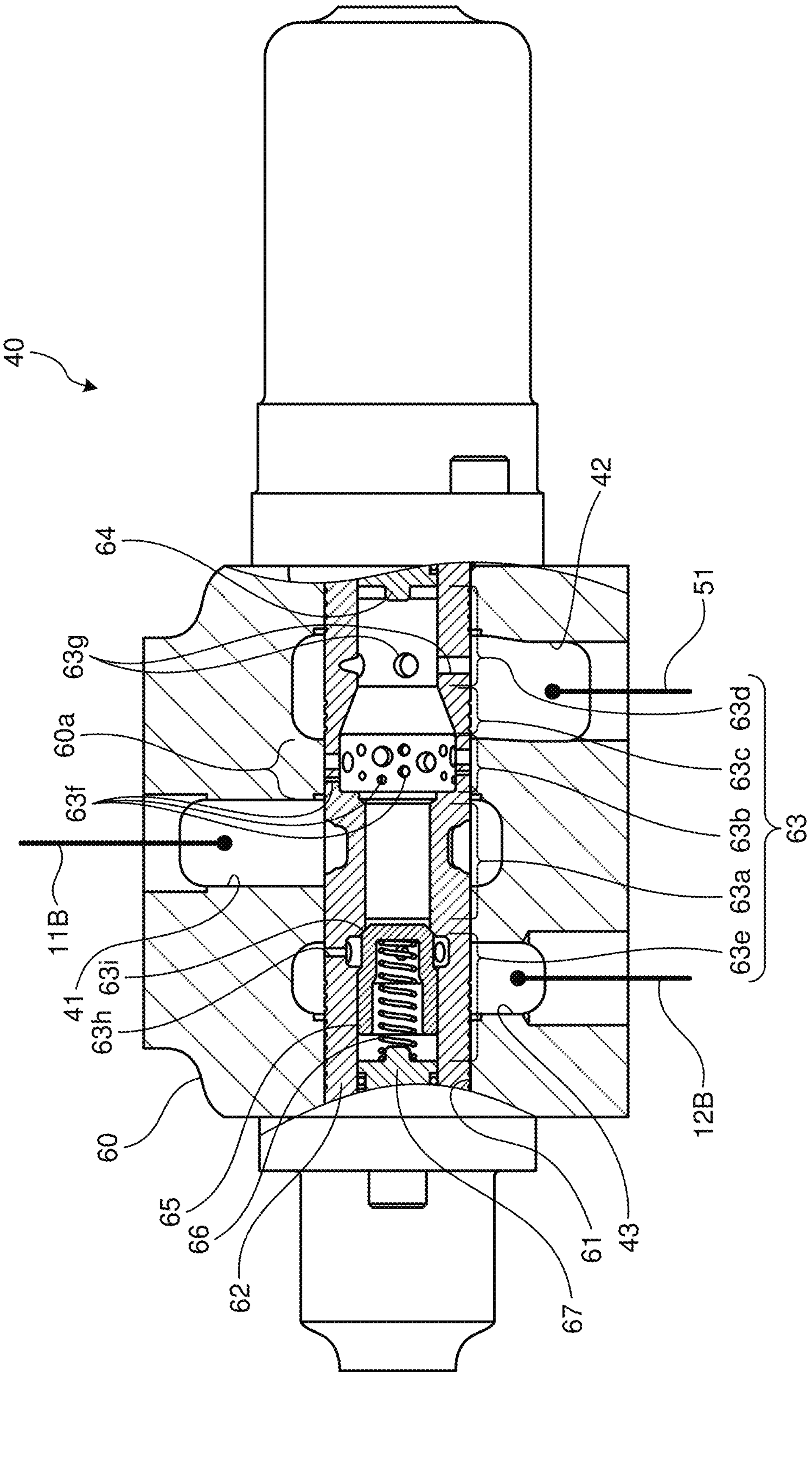
FIG. 4 is a cross-sectional view illustrating a structure of the hydraulic valve applied to the circuit diagram illustrated in FIG. 1.
Figure 5:
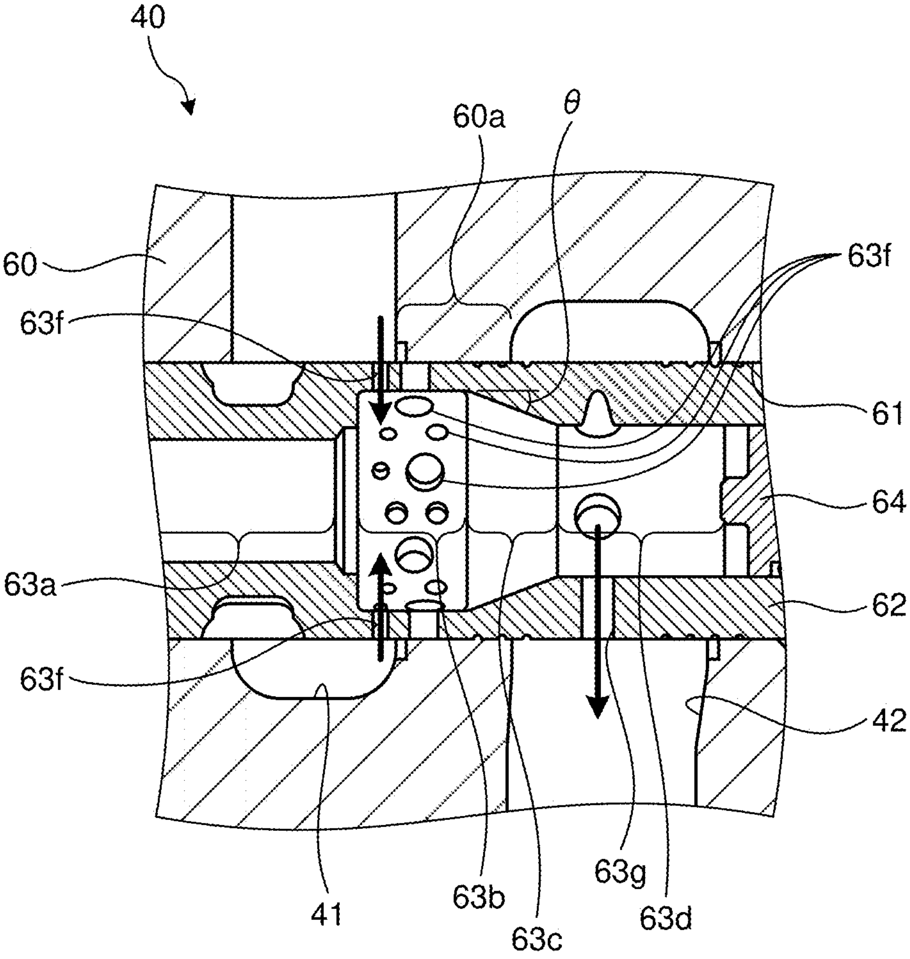
FIG. 5 is an enlarged cross-sectional view of a main portion of the hydraulic valve illustrated in FIG. 4.
Figure 6:
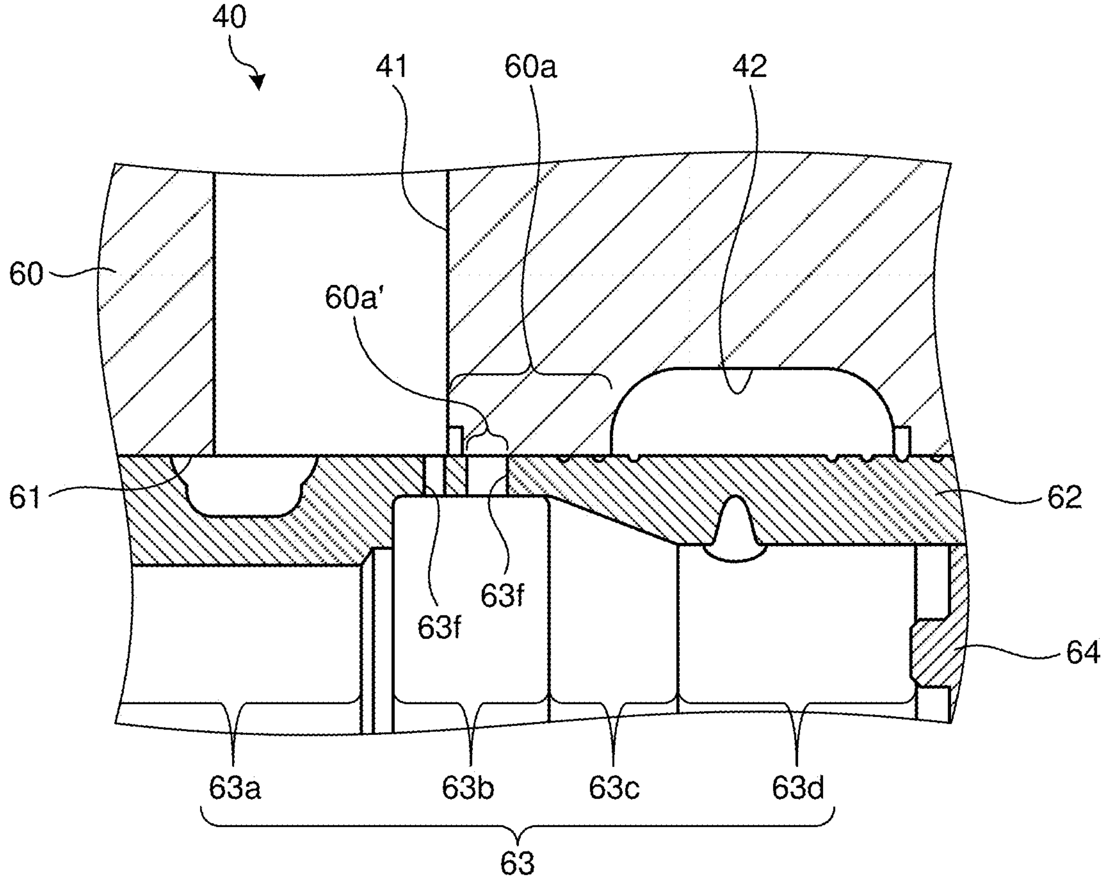
FIG. 6 is a partially enlarged view of FIG. 5.

FIG. 4 to FIG. 6 are views illustrating a specific configuration of the flow rate control valve 40. Hereinafter, the configuration of the flow rate control valve 40 will be described in detail with reference to FIG. 4 to FIG. 6 as appropriate, and characteristic portions of the present disclosure will be described together. As is apparent from the drawings, the flow rate control valve 40 includes a valve main body 60 configured in a block shape. The valve main body 60 is provided with a spool hole 61, and is provided with the above-described meter-out port 41, drain port 42, and regeneration port 43 in such a manner as to communicate with the spool hole 61. The spool hole 61 is a through hole having a circular cross section and a linear axial center, and includes a spool 62 therein. The spool 62 is a columnar member having an outer diameter fitted to the spool hole 61, and is arranged in the valve main body 60 in a state of being movable along the axial center of the spool hole 61. Although not clearly illustrated in the drawing, a return spring 48 (see FIG. 1) that biases the spool 62 to the right side in FIG. 4 with respect to the valve main body 60 and maintains the spool 62 at a normal position is provided between an end portion of the spool 62 and the valve main body 60, and a pressure chamber 49 (see FIG. 1) to which the pilot pressure is supplied from the operation valve (not illustrated) is provided. The pressure chamber 49 functions to move the spool 62 to the left side in FIG. 4 against spring force of the return spring 48 in a case where the pilot pressure is supplied from the operation valve (not illustrated) in such a manner as to arrange the direction switching valve 30 at the contracted position. The meter-out port 41, the drain port 42, and the regeneration port 43 are configured to have portions surrounding a periphery of the spool hole 61, and are provided at positions separated from each other in the axial center direction of the spool 62. In the illustrated example, the drain port 42 and the regeneration port 43 are respectively provided in portions on both sides of the meter-out port 41.

The spool 62 is provided with a main passage portion 63. The main passage portion 63 is a through hole formed in an axial center portion of the spool 62, and has a reference region 63*a*, a meter-out region (first region) 63*b*, a tapered region (third region) 63*c*, a drain region (second region) 63*d*, and a valve region 63*e*. The reference region 63*a* is a blank space having a circular cross section and is configured to have a constant inner diameter.

The meter-out region 63*b* is a blank space having a constant inner diameter and a circular cross section, and is provided adjacent to the right side of the reference region 63*a* in FIG. 4. The inner diameter of the meter-out region 63*b* is formed to be larger than that of the reference region 63*a*. In the meter-out region 63*b*, a meter-out passage portion (first passage portion) 63*f* to form the above-described meter-out throttle 44 is formed. The meter-out passage portion 63*f* is a through hole having a circular cross section and formed in the radial direction of the spool 62, and a plurality of the meter-out passage portions 63*f* having different cross-sectional areas is formed in such a manner as to be arranged side by side in a circumferential direction and the axial center direction. In a case where the spool 62 is arranged at the normal position, the meter-out passage portions 63*f* are entirely covered by a land portion 60*a* located between the meter-out port 41 and the drain port 42 in the valve main body 60. On the other hand, when the spool 62 moves to the left side with respect to the valve main body 60, the meter-out passage portions 63*f* open to the meter-out port 41, and function to gradually increase the opening area between the main passage portion 63 and the meter-out port 41. In the flow rate control valve 40 of the present embodiment, since the inner diameter of the meter-out region 63*b* is formed to be larger than that of the reference region 63*a*, the large number of meter-out passage portions 63*f* can be formed in a manner of not interfering with each other.

The tapered region 63*c* is a blank space provided adjacent to the right side of the meter-out region 63*b*, and is formed in a tapered shape in which the inner diameter gradually decreases toward the right side. The inner diameter of the tapered region 63*c* decreases at a constant rate, and an inner peripheral surface extends linearly in a cross section including the axial center. In the illustrated example, the tapered region 63*c* is formed in such a manner that an inclination angle θ with respect to the meter-out region 63*b* is 21°. The inclination angle θ of the tapered region 63*c* is preferably in a range of 15 to 30°. In other words, a rate at which the inner diameter decreases toward the right side in the axial center direction is preferably in a range of tan 15° to tan 30°. The inner diameter of a portion located on the rightmost side of the tapered region 63*c* is set to be larger than that of the reference region 63*a* and smaller than that of the meter-out region 63*b*.

The drain region 63*d* is a blank space having a circular cross section having a constant inner diameter and provided adjacent to the right side of the tapered region 63*c*. The inner diameter of the drain region 63*d* is the same as that of the smallest diameter portion of the tapered region 63*c*. The drain region 63*d* is provided with a drain passage portion (second passage portion) 63*g* to form the drain-side fixed throttle 45 described above. The drain passage portions 63*g* is a through hole having a circular cross section and formed in the radial direction of the spool 62, a plurality of the drain passage portions 63*g* being formed at equal intervals in the circumferential direction. These drain passage portions 63*g* are provided in such a manner as to constantly communicate with the drain port 42 from a state in which the spool 62 is arranged at the normal position to a state in which the spool 62 moves to the left side and the meter-out passage portions 63*f* are all open to the meter-out port 41. A plug 64 is attached to a portion of the main passage portion 63 which portion is on the right side of the drain region 63*d*.

The valve region 63*e* is a blank space having a circular cross section and provided adjacent to a portion on the left side of the reference region 63*a*. In the valve region 63*e*, a valve body 65 and a return spring 66 to form the check valve 46 described above are housed, and a regeneration passage portion 63*h* to form the regeneration-side fixed throttle 47 described above is provided. The valve body 65 prevents the oil from flowing between the reference region 63*a* and the valve region 63*e* in a case of abutting on a valve seat portion 63*i* provided therebetween, and allows the oil to flow therebetween in a case of moving to the left side and being separated from the valve seat portion 63*i*. The return spring 66 is interposed between a plug 67 attached to a portion of the main passage portion 63, which portion is on the left side of the valve region 63*e*, and the valve body 65, and biases the valve body 65 in such a manner as to constantly abut on the valve seat portion 63*i*. The regeneration passage portion 63*h* is a through hole having a circular cross section and formed in the radial direction of the spool 62, a plurality of the regeneration passage portions 63*h* being formed at equal intervals in the circumferential direction.

In the hydraulic circuit configured in the above manner, when the operation valve (not illustrated) is operated in such a manner as to raise the leading end portion of the boom 3, as illustrated in FIG. 2, the direction switching valve 30 is arranged at the extended position in a state in which the flow rate control valve 40 is arranged at the normal position. As a result, the oil discharged from the hydraulic pump 20 is supplied to the bottom chamber 1*a* of the hydraulic cylinder 1 through the pump oil passage 22 and the bottom oil passage 11. As a result, the hydraulic cylinder 1 performs the extension operation, and the leading end portion of the boom 3 moves upward.

On the other hand, when the operation valve (not illustrated) is operated in such a manner as to lower the leading end portion of the boom 3, as illustrated in FIG. 3, the direction switching valve 30 is arranged at the contracted position, the spool 62 of the flow rate control valve 40 moves to the left side with respect to the valve main body 60, and the opening area of the meter-out passage portions 63*f* (meter-out throttle 44) changes according to the pilot pressure applied from the operation valve (not illustrated). As a result, a part of the oil discharged from the bottom oil passage 11 passes through the flow rate control valve 40 through the second bottom oil passage 11B, a flow rate of the oil to the oil tank 50 is limited by the meter-out throttle 44, and a part of the oil passing through the flow rate control valve 40 is regenerated to the rod chamber 1*b* of the hydraulic cylinder 1 through the check valve 46, the regeneration passage portion 63*h* (regeneration-side fixed throttle 47), and the second rod oil passage 12B. Thus, by adjusting the opening area of the meter-out passage portions 63*f* in the flow rate control valve 40, it is possible to control a speed of when the hydraulic cylinder 1 contracts against weight of the boom 3, the arm 6, and the bucket 7.

Incidentally, in a case where the above-described flow rate control is performed, as illustrated in FIG. 6, the oil flows into the main passage portion 63 of the spool 62 from the meter-out port 41 in a state in which a part of the meter-out passage portions 63*f* is closed by a land portion 60*a*' of the valve main body 60. Since the meter-out passage portions 63*f* closed by the land portion 60*a*' of the valve main body 60 are recessed portions opened to the main passage portion 63, the oil therein is likely to be accumulated.

Here, in a case where the oil flows from the meter-out port 41 on the high pressure side to the main passage portion 63 on the low pressure side, air bubbles are generated in the oil, and the air bubbles move inside the main passage portion 63 together with the oil. The oil flowing into the main passage portion 63 is appropriately reversed between the plug 64 and the valve body 65 inside the main passage portion 63 until being discharged to the drain port 42 through the drain passage portions 63*g*. In a case of reaching the recessed portions formed by the meter-out passage portions 63*f* (closed meter-out passage portions 63*f*), the air bubbles included in the oil reversed to an upstream side may be accumulated inside. In a case of collapsing, the air bubbles may cause erosion in the land portion 60*a*'.

However, according to the flow rate control valve 40 described above, since the tapered region 63*c* the inner diameter of which gradually decreases is provided between the meter-out region 63*b* and the drain region 63*d*, the oil smoothly flows downstream. Thus, the air bubbles generated in the oil when flowing into the main passage portion 63 from the meter-out port 41 travel downstream without being accumulated in the meter-out region 63*b*, and are discharged to the drain port 42 through the drain passage portions 63*g*. Furthermore, when the oil is reversed from the drain region 63*d* toward the meter-out region 63*b*, the tapered region 63*c* functions as the diffuser, and the pressure of the oil decreases when reaching the meter-out region 63*b*. Thus, even when the air bubbles reach the meter-out passage portions 63*f*, it is possible to prevent the collapse thereof, and there is no possibility that erosion is generated in the land portion 60*a*' of the valve main body 60. This prevents a situation in which the leakage amount of the oil increases even when the utilization period becomes long, and the flow rate control of the oil can be accurately and finely performed. In addition, since the erosion is not generated in the land portion 60*a*' of the valve main body 60, there is no oil leakage between the valve main body 60 and an outer peripheral surface (spool land portion) of the spool 62, and it is possible to prevent a problem such as a natural fall of the boom 3, for example.

Although the hydraulic cylinder to operate the boom of the work machine has been described as an example in the above-described embodiment, the present disclosure is not limited thereto. In this case, the first port does not need to be a meter-out port, and the second port does not need to be a drain port. In addition, although a tapered portion the inner diameter of which decreases at the constant rate is described as an example of the third region, a tapered portion may be curved in a protruded shape with a rate of decrease in the inner diameter from the first region toward the second region being changed, or may be configured to be curved in a recessed shape.

REFERENCE SIGNS LIST

1 HYDRAULIC CYLINDER
1*a* BOTTOM CHAMBER
11B SECOND BOTTOM OIL PASSAGE
40 FLOW RATE CONTROL VALVE
41 METER-OUT PORT
42 DRAIN PORT
50 OIL TANK
51 TANK OIL PASSAGE
60 VALVE MAIN BODY
62 SPOOL
63 MAIN PASSAGE PORTION
63*b* METER-OUT REGION
63*c* TAPERED REGION
63*d* DRAIN REGION
63*f* METER-OUT PASSAGE PORTION
63*g* DRAIN PASSAGE PORTION

The invention claimed is:

1. A hydraulic valve comprising:

a valve main body having a first port and a second port independent from each other; and a spool arranged in such a manner as to be movable along an axial center with respect to the valve main body, wherein the spool is provided with a main passage portion provided in an axial center portion, a first passage portion provided between the main passage portion and an outer peripheral surface and communicable with the first port, and a second passage portion provided between the main passage portion and the outer peripheral surface and communicable with the second port, an opening area of the first passage portion with respect to the first port is changed along with movement of the spool, and flow rate control of oil from the first port to the second port through the main passage portion is performed, a plurality of the first passage portions is provided in the spool in such a manner as to communicate with the first port at timings different from each other, and the main passage portion of the spool has a first region in which the first passage portions are provided, a second region in which the second passage portion is provided, and a third region that connects the first region and the second region, an inner diameter of the first region being formed larger than that of the second region, and the third region being formed in a tapered shape in which an inner diameter gradually decreases toward the second region.

2. The hydraulic valve according to claim 1, wherein the inner diameter of the third region decreases at a constant rate from the first region toward the second region.

3. The hydraulic valve according to claim 2, wherein in the third region, the rate at which the inner diameter decreases with respect to a length in an axial center direction of the main passage portion is in a range of tan 15° to tan 30°.

4. A hydraulic circuit, wherein a meter-out oil passage communicating with a bottom chamber of a hydraulic cylinder is connected to the first port of the hydraulic valve according to claim 1, and a tank oil passage communicating with an oil tank is connected to the second port.

* * * * *